(12) United States Patent
Hua-Tang et al.

(10) Patent No.: US 7,268,857 B2
(45) Date of Patent: Sep. 11, 2007

(54) OPTICAL SYSTEM FOR LASER RANGE FINDER

(75) Inventors: Liu Hua-Tang, Taichung (TW); Chen Hui-Qing, Hang-zhou (CN); Chen Hai Hua, Hang-zhou (CN)

(73) Assignee: Asia Optical Co., Inc., Taichung (TW)

( * ) Notice: Subject to any disclaimer, the term of this patent is extended or adjusted under 35 U.S.C. 154(b) by 382 days.

(21) Appl. No.: 10/897,036

(22) Filed: Jul. 23, 2004

(65) Prior Publication Data

US 2005/0206872 A1    Sep. 22, 2005

(30) Foreign Application Priority Data

Mar. 17, 2004  (TW) .............................. 93107082 A

(51) Int. Cl.
*G01C 3/08* (2006.01)
(52) U.S. Cl. ..................................... 356/4.01; 356/5.01
(58) Field of Classification Search ....... 356/4.01–5.15
See application file for complete search history.

(56) References Cited

U.S. PATENT DOCUMENTS

| | | | |
|---|---|---|---|
| 5,231,621 A * | 7/1993 | Matsui et al. ............ | 369/44.32 |
| 5,815,251 A | 9/1998 | Ehbets et al. ............. | 356/5.01 |
| 5,949,531 A | 9/1999 | Ehbets et al. ............. | 356/5.01 |
| 6,407,967 B1 * | 6/2002 | Odajima et al. ......... | 369/44.23 |
| 2004/0207832 A1 * | 10/2004 | Ohtomo et al. ........... | 356/4.01 |

FOREIGN PATENT DOCUMENTS

RU    2139498 C1 * 10/1999

\* cited by examiner

*Primary Examiner*—Thomas H. Tarcza
*Assistant Examiner*—Isam Alsomiri

(57) ABSTRACT

An optical system for a laser range finder comprises a laser emitter (5), a collimating lens (4) positioned in front of the laser emitter an optical receiver (3), a light receiving aspheric lens (1) for converging reflected light from a target object to be measured on the optical receiver, and a polygonal prism (2) disposed between the light receiving aspheric lens and the optical receiver. The light receiving aspheric lens defines a cutout in a position corresponding to a laser light beam emitted by the laser emitter for allowing passage of the laser light beam therethrough. The polygonal prism consists of a first portion and a second portion refracting the reflected light at different refraction angles for light path compensating purposes.

13 Claims, 4 Drawing Sheets

OPTICAL SYSTEM FOR LASER RANGE FINDER

BACKGROUND OF THE INVENTION

1. Field of the Invention

The present invention relates to a laser range finder, and particularly relates to an optical system for a laser range finder.

2. Description of Prior Art

A laser range finder is one of the main devices for distance measurement. A common type of laser range finder usually applies a laser emitter as a light source for transmitting a modulated laser light beam to a target object to be measured. The target object reflects and returns the laser light beam to a laser receiver, which is commonly an avalanche photo diode (APD) to convert the optical signal into an electric signal. The distance to the target object is determined by multiplying the light velocity by the time interval between the pulse emission time and the reflected beam reception time.

However, as the light velocity is an extremely large value, the processing of electric signals must be very careful and accurate to obtain an accurate time value, so that the accuracy of the distance to the target object may be ensured. Additionally, the light has the diffusibility characteristic, and thus the target object can only reflect a portion of the transmitted light for reception by the laser receiver. The reflected light is reduced to a little amount especially when no auxiliary cooperative target is provided. Furthermore, the ambient rays and dust particles etc. may interfere with or influence the reflected light, causing reduction of the signal to noise ratio, thereby affecting the measuring precision of the range finder. One solution to this problem is to increase the laser transmitting power, which results in increased cost and hurt to the operator's eye.

Distance measurement by laser encounters many technical difficulties in short distance and high precision applications. These technical difficulties include the reception of the reflected light from a target object at a short distance, the acceptable light amount limit of the APD, the requirement of equal optical path length for high precision distance measurement, and so on.

One conventional solution in this aspect is to adopt a light guide. The measuring light beam reflected from the target object is received by a reception objective lens, and is converged on and coupled to the light guide. The reflected light beam is first transmitted along the light guide for a predetermined distance, then coupled to a small lens, and finally converged on the APD. The advantage of light guide transmission consists in the fact that the position of the APD may be adjusted and it is also suitable for laser distance measurement in the case of short distances to the target object. In respect of reception of the reflected light beam from a near target object, U.S. Pat. Nos. 5,815,251 and 5,949,531 propose various solutions as respectively shown in FIGS. 1-4. FIG. 1 illustrates a first solution which uses a motor driven eccentric 12 to displace a leafspring 13, whereby the position of the light guide mount 14 with a light guide entry surface 16 on the right side thereof may be transversely adjusted correspondingly. The light energy is than transmitted to an optoelectronic converter 15 to achieve the reception of the reflected light beam from the near target object. FIG. 2 shows a second solution which uses a planar mirror 21 for reflecting the incident light reflected from the near target object at large incident angles on the light guide entry surface 16 and then to the receiver. However, this proposal may cause bending and scattering of light to some extent. A third solution is shown in FIG. 3, which uses a prism 31 to refract the reflected light at large incident angles in the case of short distances to the target object. One problem with this proposal is that the prism 31 may also refract the reflected light from some distant target objects, which results in insufficient light energy for the light guide. Consequently, the prism 31 must be removed in the case of relatively large distances to the target object. FIG. 4 illustrates a fourth solution that uses a diffractive element 41 applicable to the reflected light from different directions. One disadvantage for this solution is that the configuration of the diffractive element 41 is relatively complex, and thus is not cost-effective.

Although the above-mentioned conventional solutions are applicable to some actual applications, no consideration can be found in the above references concerning the efficiency ratio of the reflected light to the emitted light and the requirement of equal optical path length as well, whereby the signal accuracy thus cannot be increased. Secondly, some solutions require motor driving, or require insertion/removal of a specific element into/from the optical system when measuring different distances to near or distant target objects. These additional configurations or elements bring instability to the system, thereby decreasing the reliability of the system and also increasing the manufacturing cost of the system.

SUMMARY OF THE INVENTION

The object of the present invention is to provide an optical system for a laser range finder to overcome the above-mentioned disadvantages of the prior art. By the provision of this optical system, even no auxiliary cooperative target is provided and in the case of measuring short distances to the target object, optical signals may still be received by the APD within the entire measuring range of the laser range finder. The received optical signals satisfy the acceptance range requirement of the APD and the requirement of equal optical path length as well, so that the photoelectrically converted carrier signals can be easily detected.

To achieve the above object of the present invention, an optical system for a laser range finder in accordance with the present invention comprises a laser emitter, a collimating lens positioned in front of the laser emitter, an optical receiver, a light receiving aspheric lens for converging the reflected light beam on the optical receiver, and a polygonal prism disposed between the light receiving aspheric lens and the optical receiver. The light receiving aspheric lens defines a cutout in a position corresponding to the emitted laser light beam for allowing passage of the laser light beam therethrough.

The polygonal prism may be a compound prism formed by two pieces of prism cemented together. The expedient seam angle and relative positions of the two pieces of prism are determined by trials or calculation, so that the light beam passing through the aspheric lens can be sufficiently converged on the optical receiver via the polygonal prism. The two pieces of prism of the polygonal prism may be made of different materials. The selection of the material and the shape and dimension of each piece of prism satisfies the requirement of equal optical path length. That is, the total optical path length of light passing through one piece of the polygonal prism is equal to the total optical path length of light passing through the other piece of the polygonal prism The polygonal prism may also be an integral part made of the same optical material. Similarly, the position of the polygonal prism is arranged corresponding to the measuring range of the range finder, so that the reflected optical signals within the entire measuring range can be received and the requirement of equal optical path length is also satisfied.

By the provision of the optical system of the present invention, the efficiency of light energy utilization is increased, the interference between the emitted and received light beams is avoided, and the requirement of equal optical path length about the received reflected light beam is met, so that the uniformity of the optical signal carrier is also achieved. By the light refraction effect of a prism, light reflected from both short distances and long distances can be received. The signal to noise ratio of the received signal is increased, so that the measuring precision and accuracy of the range finder may be increased. The stability and reliability of the system are also increased as a result of a relatively simple design of the present system. In comparison with the prior art, the optical system for a ranger finder in accordance with the present invention has the following advantages:

1. By using a polygonal prism to compensate for the phase difference and to change the light path, both short distance measurement and long distance measurement can be performed, and the signal to noise ratio is increased.

2. By using a polygonal prism to sufficiently refract the reflected light, the light energy uniformity within the entire measuring range of the range finder can be achieved, and the light energy can be sufficiently used.

3. No excessive additional configurations or elements are required by the present invention, whereby the production cost is reduced.

4. The present optical system is a simple design with a reduced number of elements and with no moving elements, thereby facilitating mass production and increasing the reliability and durability of operation.

5. The efficiency of light energy utilization has been considered by the present invention, so that flexibility exists in selecting specific laser emitters and APDs, and thus the production cost can be reduced.

BRIEF DESCRIPTION OF THE DRAWINGS

The present invention may best be understood through the following description with reference to the accompanying drawings, in which.

DETAILED DESCRIPTION OF THE INVENTION

Figure 1:
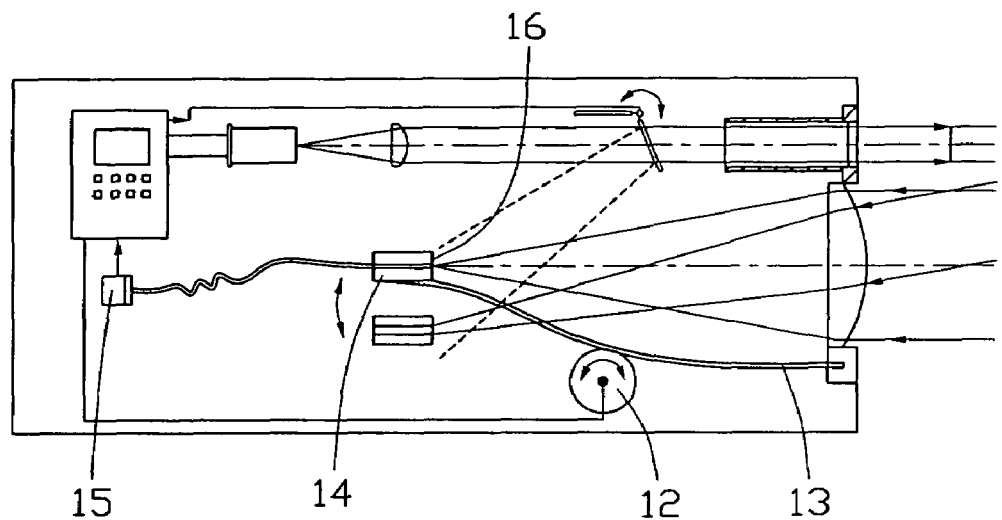
FIG. 1 is an overall representation of a conventional optical system for a range finder applying a light guide.
Figure 2:
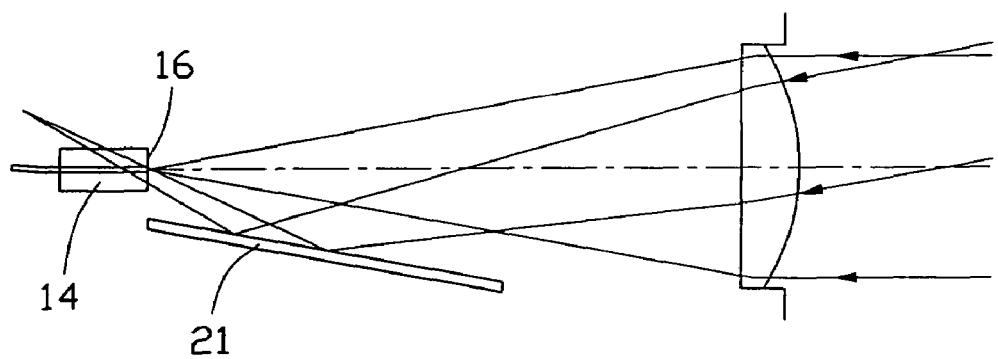
FIG. 2 is a first receiving portion of the conventional optical system of FIG. 1 having a planar mirror for beam deflection.
Figure 3:
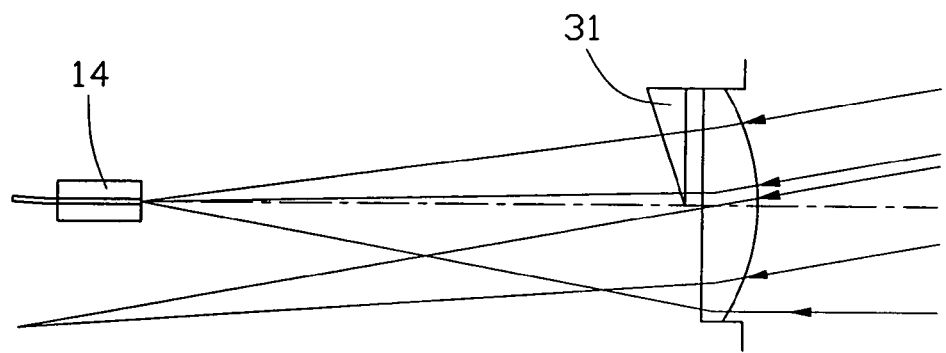
FIG. 3 is a second receiving portion of the conventional optical system of FIG. 1, with refractive beam deflection.
Figure 4:
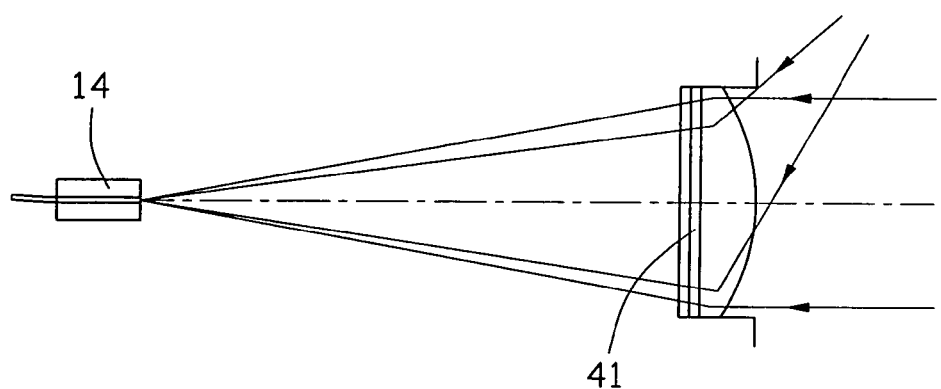
FIG. 4 is a third receiving portion of the conventional optical system of FIG. 1, with diffractive beam deflection.
Figure 5:
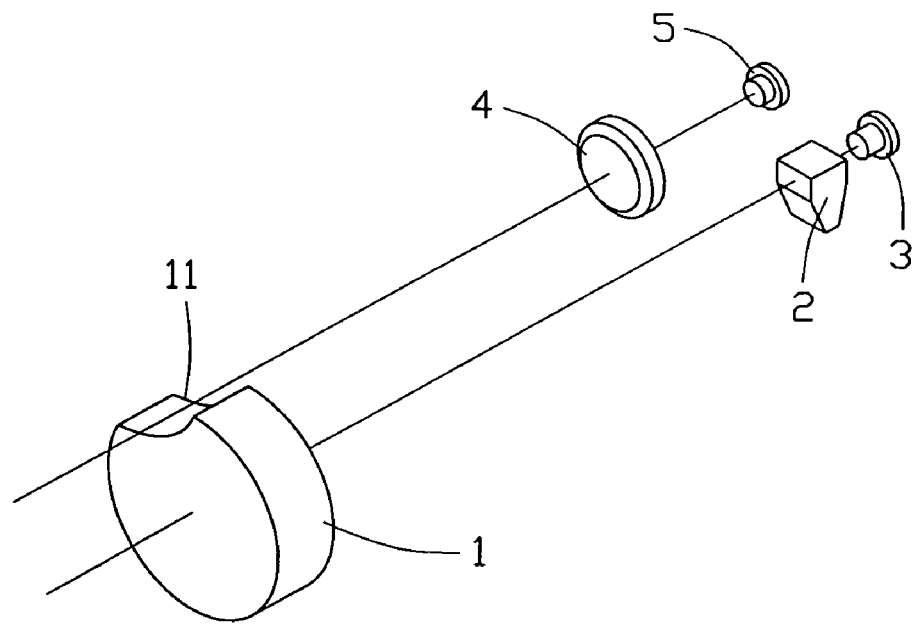
FIG. 5 is a schematic view of an optical system for a laser range finder in accordance with the present invention.

Referring to FIG. 5, an optical system for a laser ranger finder in accordance with the present invention consists of a light receiving aspheric lens 1, a polygonal prism 2, an optical receiver 3 (preferably an APD), a collimating lens 4 and a laser emitter 5 (preferably a laser diode (LD)). The laser emitter 5 functions as a light source to generate and emit laser light pulses. The emitted laser light beam is emitted through a collimating lens 4 arranged in front of the laser emitter 5 in the direction of the optical axis of the collimating lens 4 as a parallel light beam. The parallel light beam is directed to a target object (not shown) to be measured. When applicable, the target object may be positioned on an auxiliary cooperative target, such as a surveyor's pole, at the same distance. The auxiliary cooperative target helps to reflect the laser light beam more effectively, which allows the optical receiver 3 to generate an electric signal with increased ratio of signal to noise, so that the distance measurement may be more accurate. However, in some conditions, the auxiliary cooperative target may be unavailable or inapplicable. In this case, the laser light beam is diffused and reflected by the natural target object. The reflected light at various incident angles are passed through the light receiving aspheric lens 1 and are converged on the polygonal prism 2 for refraction. In the case of long distance measurement, the light beam reflected from a distant target object is a substantially parallel light beam, and is converged and refracted by the aspheric lens 1 at small refraction angles to pass through the polygonal prism 2 to be received by the optical receiver 3. On the other hand, in the case of short distance or very short distance measurement, the light beam from a near target object is reflected at a large incident angle, and is converged and refracted by the aspheric lens 1 at large refraction angles to be received by the optical receiver 3. To avoid interference between the emitted light beam by the laser emitter 5 and the reflected light beam to be received by the optical receiver 3, in this preferred embodiment, a cutout 11 is defined in the aspheric lens 1 in a position corresponding to the emitted light beam for allowing passage of the emitted light beam therethrough. Alternatively, the cutout 11 may be replaced by an aperture to perform the same function.

Figure 6:
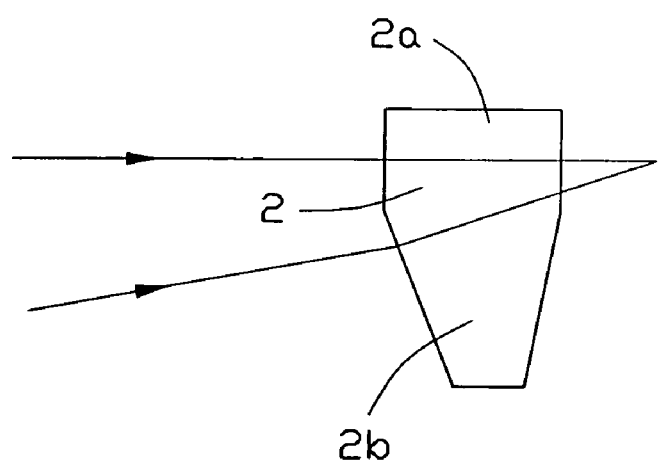
FIG. 6 is a schematic diagram of a polygonal prism shown in the optical system of FIG. 5.

FIG. 6 illustrates a schematic diagram of the polygonal prism 2 which may be an integral prism made by cutting glass into the desired shape, or a compound prism cemented by two pieces of prism of different material. The polygonal prism 2 may be divided into a first portion 2a and a second portion 2b. The first portion 2a is preferably positioned in alignment with the optical axis of the aspheric lens 1, so that the return light beam, which is reflected from the distant target object in a direction substantially parallel to the emitted collimated light beam and which is converged by the aspheric lens 1 on the polygonal prism 2, may directly pass through the first portion 2a of the polygonal prism 2 to be received by the optical receiver 3. The first and second portions 2a, 2b are arranged at a predetermined angle, so that the return light beam, which is reflected from the near target object at large incident angles and which is converged by the aspheric lens 1 but in a direction departing from the optical axis of the aspheric lens, may nevertheless be received by the optical receiver 3 via the refraction effect of the polygonal prism 2. This design of the polygonal prism 2 allows the optical receiver 3, whether for long distance measurement or short distance measurement, to receive a sufficient amount of the reflected light, so that the signal to noise ratio of the electric signal may be increased. The expedient seam angle and relative positions of the first and second portions 2a, 2b of the polygonal prism 2 may be calculated from the measuring range of the range finder. By adjusting the position and dimension of the polygonal prism 2, the focal point displacement for short distance measurement can be compensated, whereby short distance measurement can be performed by the optical system, and energy difference of the signals received by the optical receiver 3 can be confined to an acceptable level within the entire measuring range of the laser range finder, so that the complexity and difficulty of signal processing for related circuitry are reduced.

As there exists light path difference between the reflected light at large incident angles when in the case of short distance measurement, the light wave emitted at the same time but at different phases will be received by the APD at different time, whereby signal confusion and processing difficulty may be caused. Additionally, as the transmitting velocity of light in some mediums is much slower than that in the air, the corresponding light path may be several times that for air transmission. Accordingly, the material of the polygonal prism 2 should be so selected that the light ray with a long light path through the air will have a short light path through the polygonal prism 2, and the light ray with a short light path through the air will have a long light path through the polygonal prism 2. In this preferred embodiment, the polygonal prism 2 is made of glass. The shape, material and dimension of the second portion 2b of the polygonal prism 2 can be easily determined by calculation and trials, so that different phases of the reflected light incident on the second portion 2b at various angles can be compensated by the second portion 2b. As a result, the light have substantially the same light path lengths in the entire transmitting path, whereby the light transmitted at the same time but at different phases can be received by the optical receiver 3 at the same time. Since the second portion 2b of the polygonal prism 2 is phase compensable, the incident light passing through the second portion 2b is of equal optical path length, and the optical system thus meets the requirement of equal optical path length in the entire measuring range of the laser range finder, whereby the signals received by the optical receiver 3 have high signal to noise ratios, and the measuring precision and accuracy are thus increased.

To meet the requirement of equal optical path length, the second portion 2b of the polygonal prism 2 refracts the reflected light at a larger refraction angle than that of the first portion 2a of the polygonal prism 2. As illustrated in FIG. 6, the first portion 2a of the polygonal prism 2 has light inlet and outlet surfaces parallel to each other, while the second portion 2b of the polygonal prism 2 is trapezoidal in cross-section and has light inlet and outlet surfaces nonparallel to each other. The second portion 2b of the polygonal prism 2 has a small thickness at a free end portion thereof distant from the first portion 2a of the polygonal prism 2. It should be noted that the position of the first, second portion 2a, 2b of the polygonal prism 2 and the relative inclination angle between its inlet surface and outlet surface may be adjusted according to relative positions between the aspheric lens 1, the polygonal prism 2 and the optical receiver 3, so that the optical receiver 3 may efficiently receive reflected light within different measuring ranges of different laser range finders.

Figure 7:
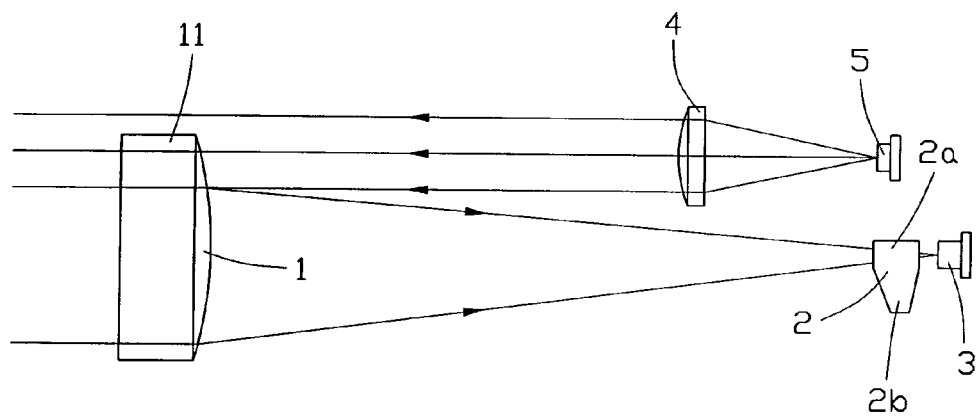
FIG. 7 is a view illustrating the light path obtained when measuring the distance to a distant target object by the optical system of the present invention.
Figure 8:
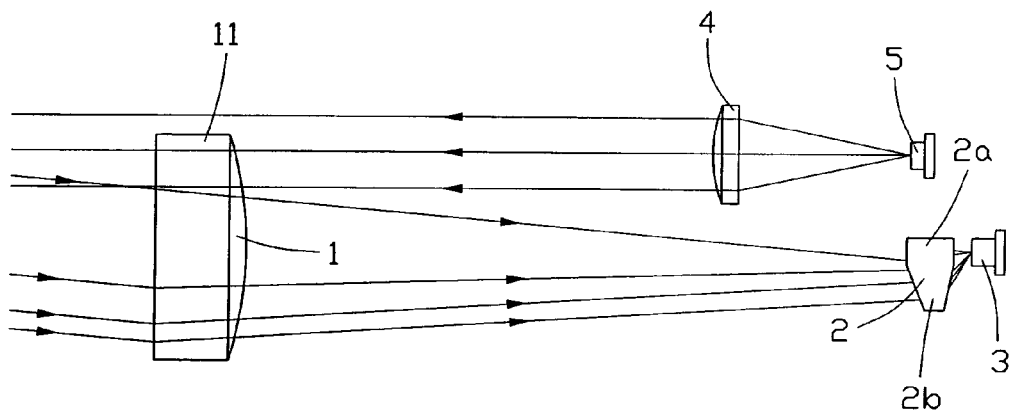
FIG. 8 is a view illustrating the light path obtained when measuring the distance to a near target object by the optical system of the present invention.

Referring to FIG. 7, in the case of long distance measurement, the reflected light from a distant target object is incident on the aspheric lens 1 in a direction substantially parallel to the emitted collimated laser light beam. These reflected light is first converged by the aspheric lens 1 on the first portion 2a of the polygonal prism 2, and then converged on a receiving area of the optical receiver 3. Referring to FIG. 8, in the case of short distance measurement, the reflected light from a near target object is incident on the aspheric lens 1 at large incident angle. These reflected light is converged by the aspheric lens 1, and a great amount of them are received and refracted by the second portion 2b of the polygonal prism 2 on the optical receiver 3. It is understandable that, when in the case of medium distance measurement, the reflected light is received by the optical receiver 3 via both the above two paths.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of portions within the principles of the invention to the full extent indicated by the broad general meaning of the terms in which the appended claims are expressed.

What is claimed is:

1. An optical system for a laser range finder measuring distance between a target and the laser range finder, comprising:
   a laser emitter emitting a light beam toward the target;
   a collimating lens positioned in front of the laser emitter;
   an optical receiver;
   a receiving lens converging light reflected from the target on the optical receiver; and
   an optical path compensator arranged between the receiving lens and the optical receiver, the optical path compensator being in the form of a polygonal prism, the polygonal prism having a first portion and a second portion refracting the reflected light at different refraction angles;
   wherein the total optical path length of light passing through the first portion of the polygonal prism is equal to the total optical path length of light passing through the second portion of the polygonal prism.

2. The optical system for a laser range finder as claimed in claim 1, wherein the polygonal prism is integrally formed.

3. The optical system for a laser range finder as claimed in claim 1, wherein the receiving lens is an aspheric lens converging and focalizing the reflected light on a predetermined focal point on one side thereof.

4. The optical system for a laser range finder as claimed in claim 1, wherein the second portion of the polygonal prism refracts the reflected light at a larger refraction angle than that of the first portion of the polygonal prism.

5. The optical system for a laser range finder as claimed in claim 4, wherein the first portion of the polygonal prism has light inlet and outlet surfaces parallel to each other.

6. The optical system for a laser range finder as claimed in claim 5, wherein the second portion of the polygonal prism has light inlet and outlet surfaces nonparallel to each other.

7. The optical system for a laser range finder as claimed in claim 6, wherein the second portion of the polygonal prism has a small thickness at a free end portion thereof distant from the first portion of the polygonal prism.

8. The optical system for a laser range finder as claimed in claim 7, wherein the second portion of the polygonal prism has a trapezoidal shape.

9. The optical system for a laser range finder as claimed in claim 1, wherein the receiving lens defines a cutout or an aperture in a position corresponding to a beam emitted by the laser emitter for allowing passage of the light beam therethrough.

10. The optical system for a laser range finder as claimed in claim 1, wherein the polygonal prism converges and focuses light from the receiving lens on the optical receiver.

11. The optical system for a laser range finder as claimed in claim 1, wherein the polygonal prism is positioned on an optical axis parallel to and offset from the optical axis where the laser emitter and the collimating lens are positioned.

12. The optical system for a laser range finder as claimed in claim 1, wherein each of the first and second portions of the polygonal prism has a light inlet side and a light outlet side, the length of the light inlet side of the second portion being larger than that of the light outlet side of the second portion and being equal to the predetermined distance between the light inlet and outlet sides of the first portion.

13. The optical system for a laser range finder as claimed in claim 1, wherein the first and second portions of the polygonal prism are formed by cementing two pieces of prism.

* * * * *